US012626132B2

(12) United States Patent
Choi et al.

(10) Patent No.: US 12,626,132 B2
(45) Date of Patent: May 12, 2026

(54) METHOD AND APPARATUS FOR COMPRESSING NEURAL NETWORK MODEL BY USING DEVICE CHARACTERISTICS

(71) Applicant: NOTA, INC., Daejeon (KR)

(72) Inventors: Shin Kook Choi, Seoul (KR); Jun Kyeong Choi, Seoul (KR)

(73) Assignee: NOTA, INC., Daejeon (KR)

( * ) Notice: Subject to any disclaimer, the term of this patent is extended or adjusted under 35 U.S.C. 154(b) by 704 days.

(21) Appl. No.: 18/056,801

(22) Filed: Nov. 18, 2022

(65) Prior Publication Data

US 2024/0144012 A1    May 2, 2024

(30) Foreign Application Priority Data

Oct. 31, 2022    (KR) ........................ 10-2022-0142354

(51) Int. Cl.
*G06N 3/0495*    (2023.01)
*G06N 3/082*    (2023.01)
(52) U.S. Cl.
CPC ........... *G06N 3/082* (2013.01); *G06N 3/0495* (2023.01)
(58) Field of Classification Search
None
See application file for complete search history.

(56) References Cited

U.S. PATENT DOCUMENTS

| | | | | |
|---|---|---|---|---|
| 11,960,982 B1* | 4/2024 | Matveev | ................. | G06N 3/084 |
| 2010/0191505 A1* | 7/2010 | Chen | ........................ | H04L 43/10 |
| | | | | 702/182 |

| | | | | |
|---|---|---|---|---|
| 2023/0077258 A1* | 3/2023 | Shen | ...................... | G06N 3/082 |
| 2024/0119291 A1* | 4/2024 | Alvarez Lopez | ...... | G06N 3/045 |
| 2025/0200371 A1* | 6/2025 | Komatsu | ............... | G06N 3/082 |

FOREIGN PATENT DOCUMENTS

| | | |
|---|---|---|
| KR | 10-2018-0013674 A | 2/2018 |
| KR | 10-2020-0066143 A | 6/2020 |
| KR | 10-2021-0144510 A | 11/2021 |

OTHER PUBLICATIONS

Communication dated Dec. 29, 2025 in Korean Application No. 10-2023-0069237.
Tien-Ju Yang, et al., "NetAdapt: Platform-Aware Neural Network Adaptation for Mobile Applications", NetAdapt, Sep. 28, 2018, arXiv:1804.03230v1 [cs.CV], pp. 1-16 (16 pages).
Charlene Yang, et al., "Hierarchichal Roofline Performance Analysis for Deep Learning Applications", Nov. 25, 2020, arXiv:2009.05257v4 [cs.DC], (9 pages).

(Continued)

*Primary Examiner* — Xuyang Xia
(74) *Attorney, Agent, or Firm* — Sughrue Mion, PLLC

(57) ABSTRACT

Provided are a method and apparatus for compressing a neural network model by using device characteristics. The method includes: obtaining the neural network model that is executed by a device; adjusting a target number of output channels of a target layer included in the neural network model, based on an arithmetic intensity obtained from a roofline model and a latency characteristic of a staircase pattern of the device; and compressing the neural network model such that the number of output channels of the target layer is equal to the adjusted target number of output channels.

11 Claims, 9 Drawing Sheets

(56)     References Cited

OTHER PUBLICATIONS

Tang, et al., "To Bridge Neural Network Design and Real-World Performance: A Behaviour Study for Neural Networks", Proceedings of the 4th MLSys Conference, 2021, (17 pages).
Kim, et al., "Compression of Deep Convolutional Neural Networks for Fast and Low Power Mobile Applications", ICLR, Feb. 24, 2016, Conference Paper, arXiv:1511.06530v2 [cs.CV], pp. 1-16 (16 pages).

* cited by examiner

FIG. 7

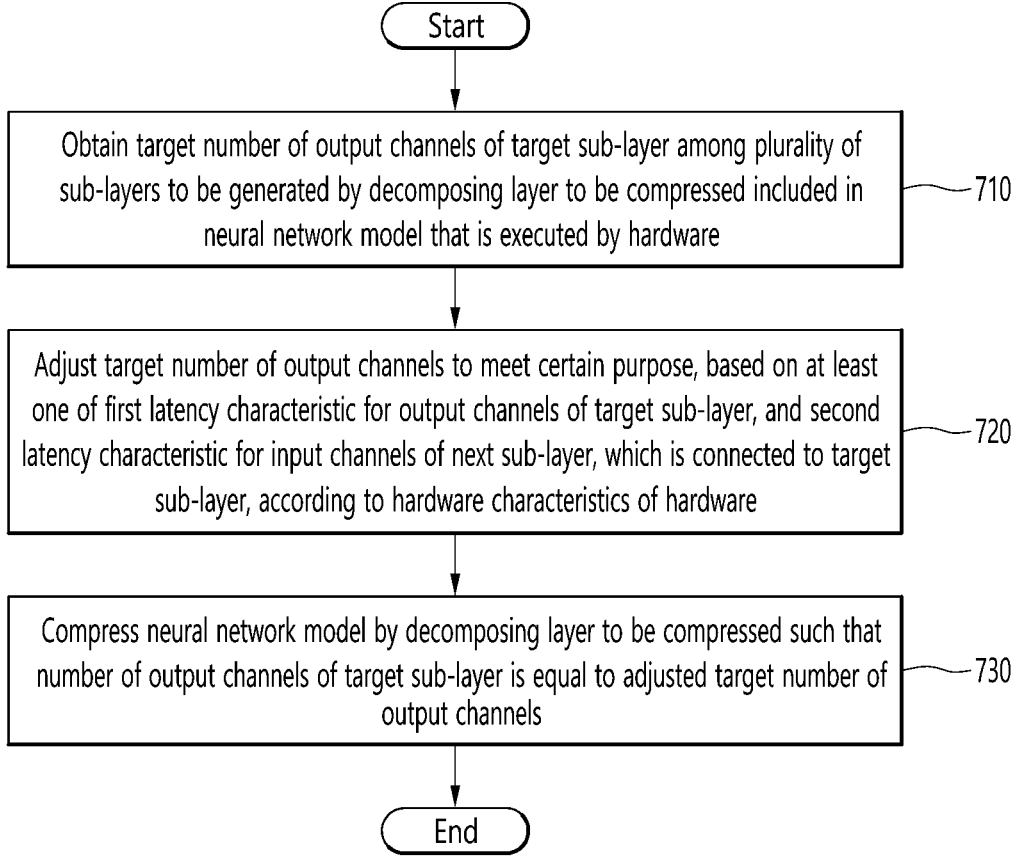

Start

Obtain target number of output channels of target sub-layer among plurality of sub-layers to be generated by decomposing layer to be compressed included in neural network model that is executed by hardware — 710

Adjust target number of output channels to meet certain purpose, based on at least one of first latency characteristic for output channels of target sub-layer, and second latency characteristic for input channels of next sub-layer, which is connected to target sub-layer, according to hardware characteristics of hardware — 720

Compress neural network model by decomposing layer to be compressed such that number of output channels of target sub-layer is equal to adjusted target number of output channels — 730

End

METHOD AND APPARATUS FOR COMPRESSING NEURAL NETWORK MODEL BY USING DEVICE CHARACTERISTICS

CROSS-REFERENCE TO RELATED APPLICATIONS

This application is based on and claims priority under 35 U.S.C. § 119 to Korean Patent Application No. 10-2022-0142354, filed on Oct. 31, 2022, in the Korean Intellectual Property Office, the disclosure of which is incorporated by reference herein in its entirety.

BACKGROUND

1. Field

The present disclosure provides a method and apparatus for compressing a neural network model by using device characteristics.

2. Description of the Related Art

Convolutional neural networks (CNNs) are models that extract a feature map by using a plurality of convolutional layers and reduces dimensionality through subsampling to obtain only important parts from the feature map. CNNs are essential in various industries, such as image classification, object detection, or image segmentation.

However, a CNN is based on numerous model parameters and computations, the performance improvement of the CNN results in a larger model size, amount of computation, and memory footprint. Therefore, it is difficult to use CNNs on devices with limited computational performance, such as mobile devices, autonomous vehicles, or edge computing devices.

To solve such an issue, a pruning technique is used to reduce the size of a neural network model by removing unnecessary parameters.

A weight pruning technique may achieve a significantly high compression ratio by removing weights with low importance in a filter, but creates unstructured sparsity, and thus, computing speed in general-purpose device environments, such as central processing units (CPUs) or graphics processing units (GPUs), may be improved to only a limited extent or even deteriorate.

A filter pruning technique removes a filter of a convolutional layer to change only the dimensionality of a weight tensor, thus, is suitable for general-purpose device, and enables actual inference acceleration without special software or device support. In addition, it may be easily applied to various CNN models, and thus has high scalability and compatibility.

Many studies have been conducted based on the advantages of the filter pruning technique, and, among them, automatic channel pruning methods have the advantage of finding the optimal structure of a pruned network by finding the optimal channel number in each layer, rather than manually or heuristically selecting channels to be pruned.

The related art described above is technical information that the inventor(s) of the present disclosure has achieved to derive the present disclosure or has achieved during the derivation of the present disclosure, and thus, it cannot be considered that the related art has been published to the public before the filing of the present disclosure.

SUMMARY

The present disclosure provides a method and apparatus for compressing a neural network model by using device characteristics. Technical objects of the present disclosure are not limited to the foregoing, and other unmentioned objects or advantages of the present disclosure would be understood from the following description and be more clearly understood from the embodiments of the present disclosure. In addition, it would be appreciated that the objects and advantages of the present disclosure can be implemented by means provided in the claims and a combination thereof.

Additional aspects will be set forth in part in the description which follows and, in part, will be apparent from the description, or may be learned by practice of the presented embodiments of the present disclosure.

A first aspect of the present disclosure may provide a method of compressing a neural network model, which is performed by a computing device, by using device characteristics including: obtaining a target number of output channels of a target layer to be compressed, among layers included in the neural network model that is executed by a device; adjusting the target number of output channels to meet a certain purpose, based on at least one of a first latency characteristic for output channels of the target layer and a second latency characteristic for input channels of a next layer, which is connected to the target layer, according to the device characteristics of the device; and compressing the neural network model such that a number of output channels of the target layer is equal to the adjusted target number of output channels.

A second aspect of the present disclosure may provide an apparatus for compressing a neural network model by using device characteristics including: a memory storing at least one program; and at least one processor configured to execute the neural network model by executing the at least one program, wherein the at least one processor is further configured to obtain a target number of output channels of a target layer to be compressed, among layers included in the neural network model that is executed by device, adjust the target number of output channels to meet a certain purpose, based on at least one of a first latency characteristic for the output channels of the target layer and a second latency characteristic for the input channels of a next layer, which is connected to the target layer, according to the device characteristics of the device, and compress the neural network model such that a number of output channels of the target layer is equal to the adjusted target number of output channels.

A third aspect of the present disclosure may provide a computer-readable recording medium having recorded thereon a program for executing, on a computer, the method of the first aspect.

In addition, other methods and apparatuses for implementing the present disclosure, and a computer-readable recording medium having recorded thereon a program for executing the method may be further provided.

Other aspects, features, and advantages other than those described above will be apparent from the following drawings, claims, and detailed description.

BRIEF DESCRIPTION OF THE DRAWINGS

The above and other aspects, features, and advantages of certain embodiments of the present disclosure will be more

3

Figure 1:
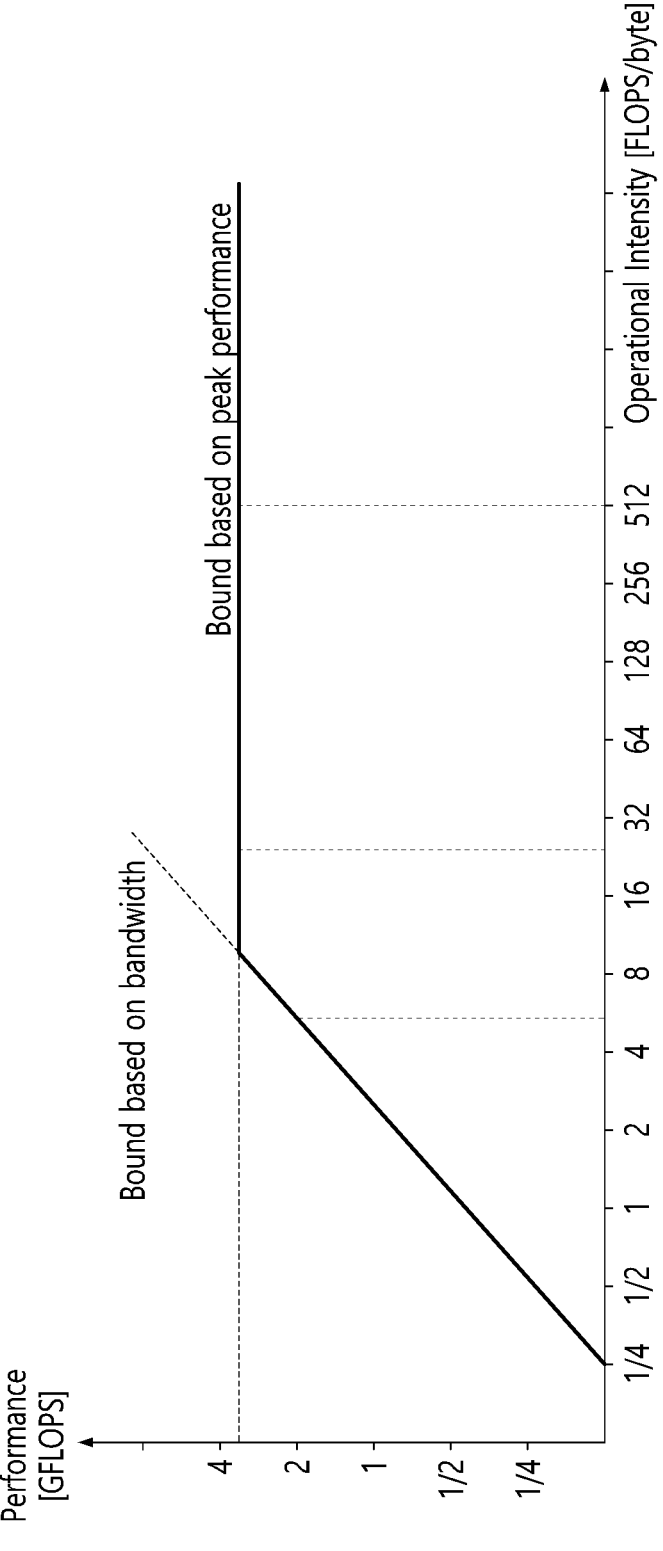
Figure 2:
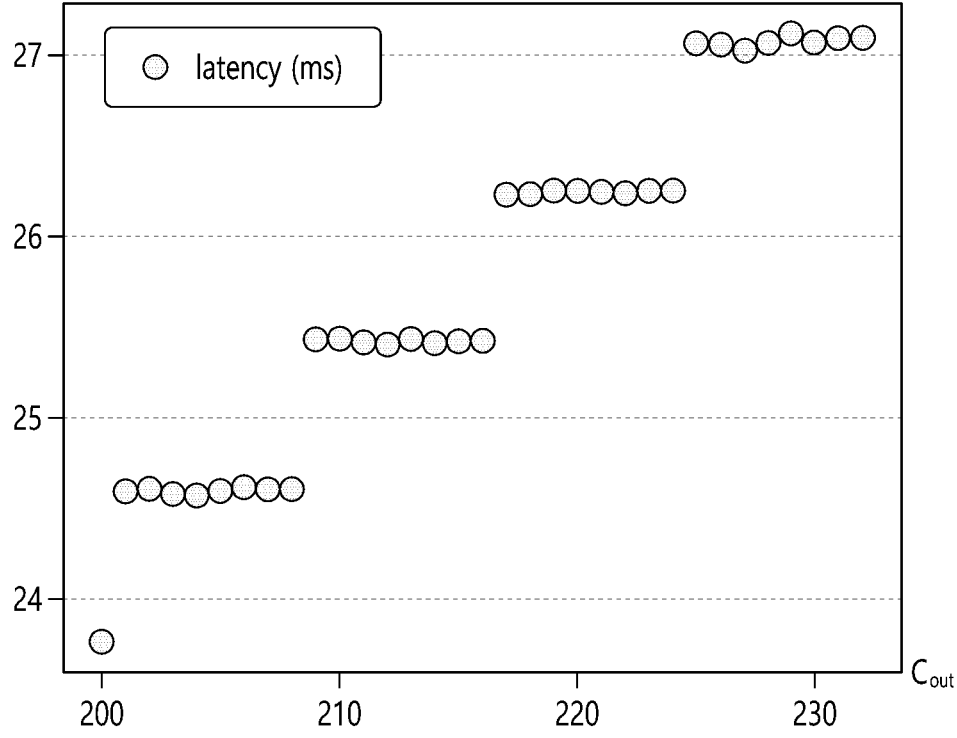
Figure 3:
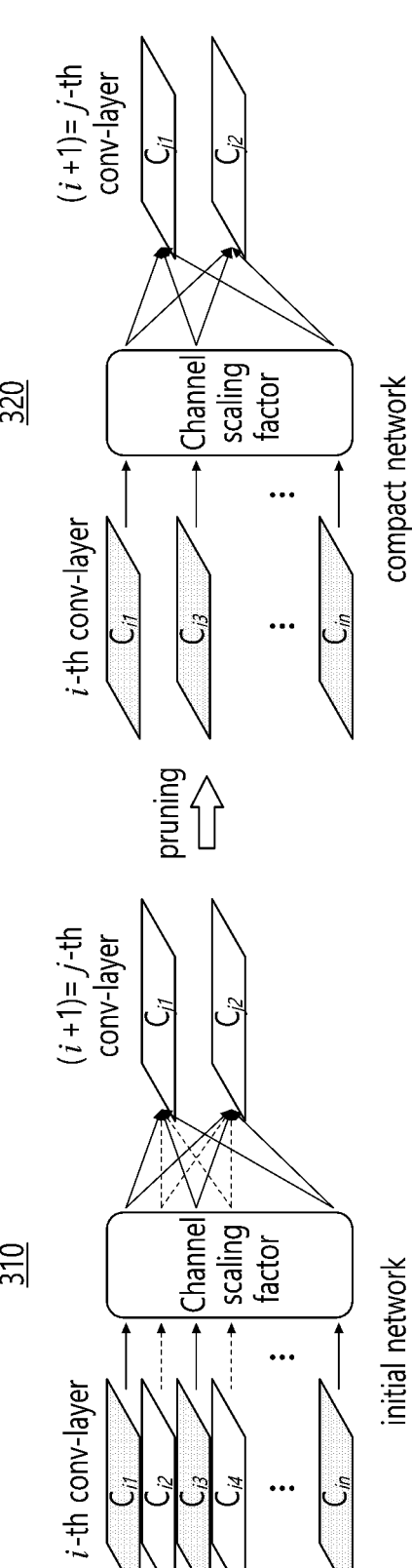
Figure 4:
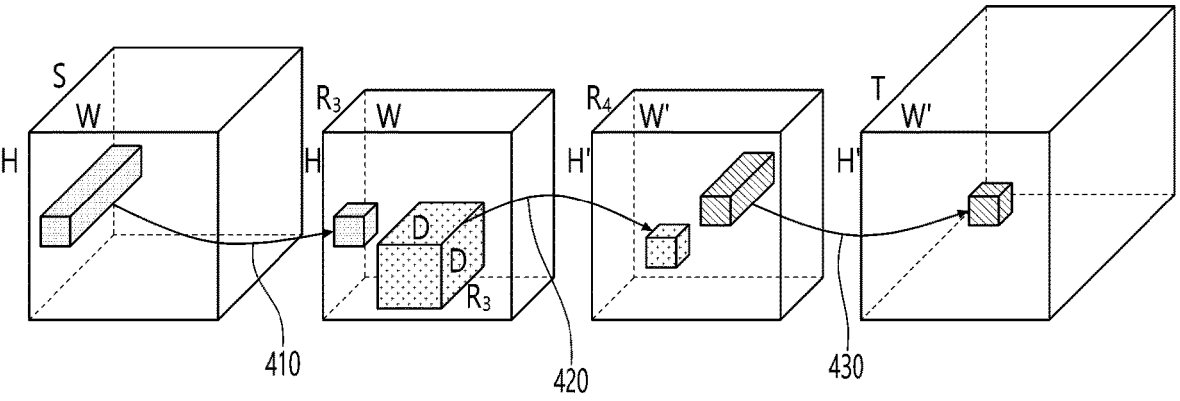
Figure 5:
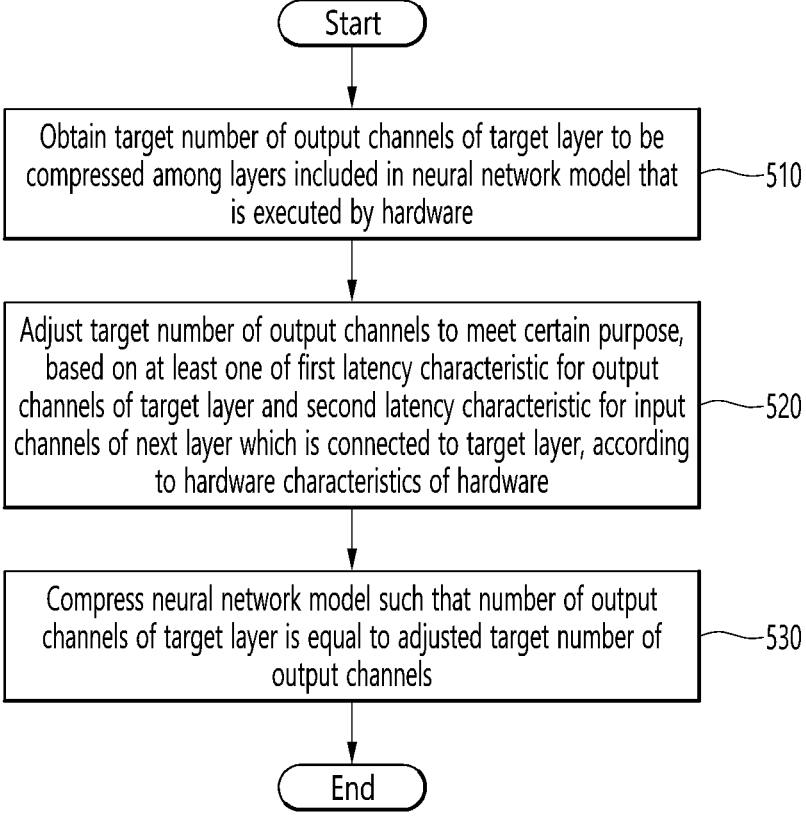
Figure 6A:
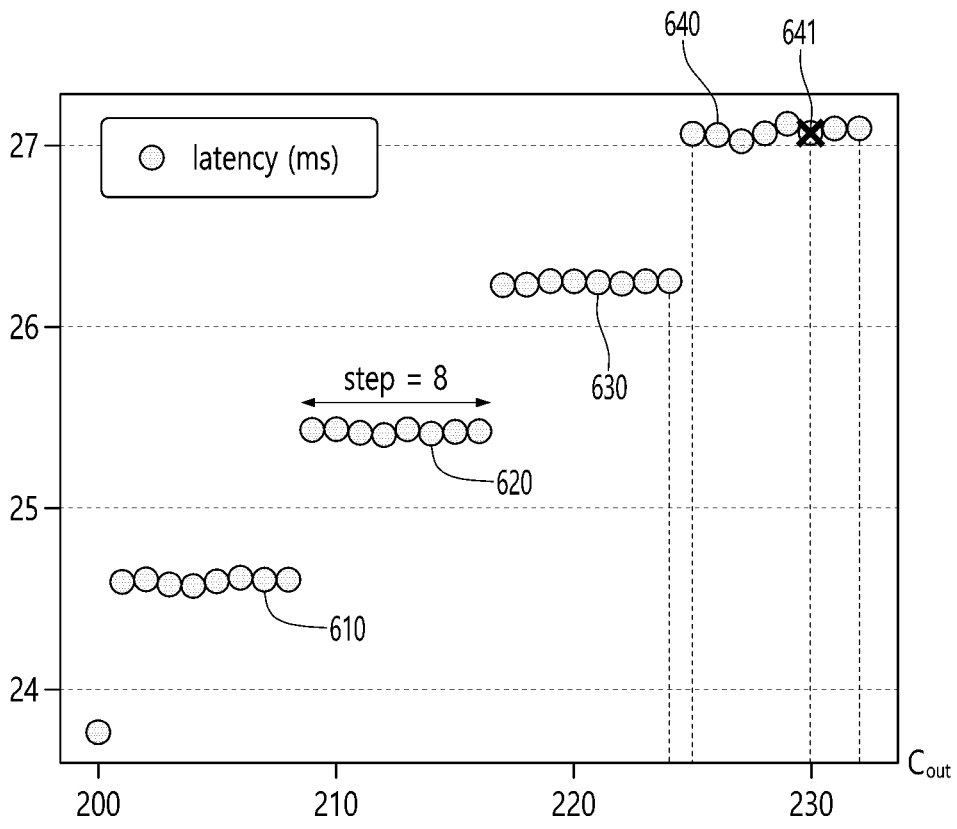
Figure 6B:
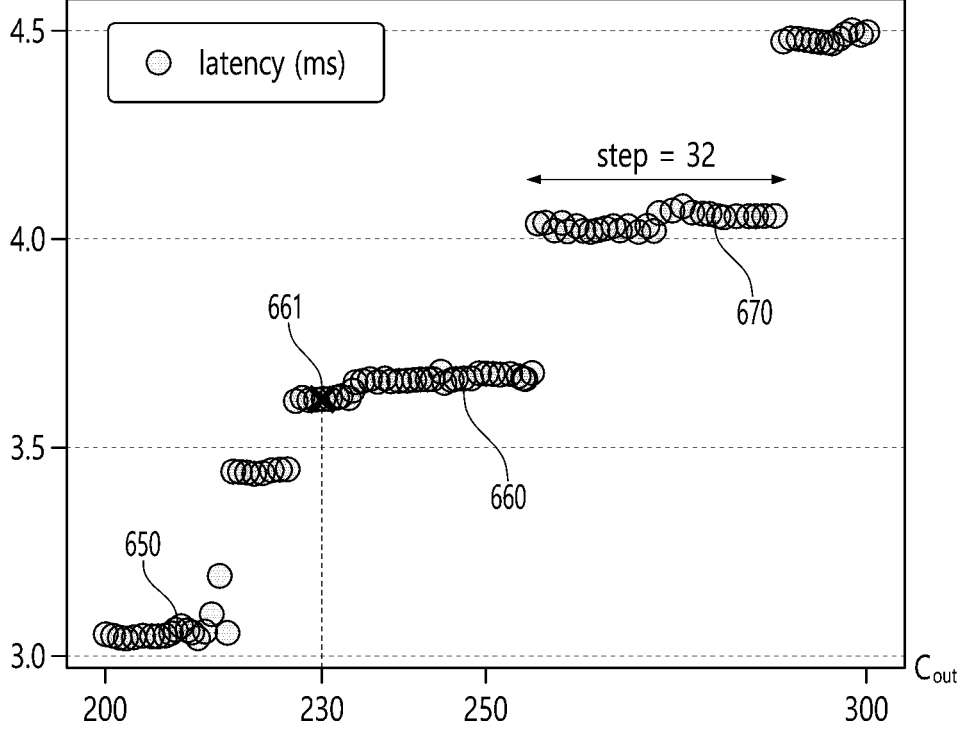
Figure 8:
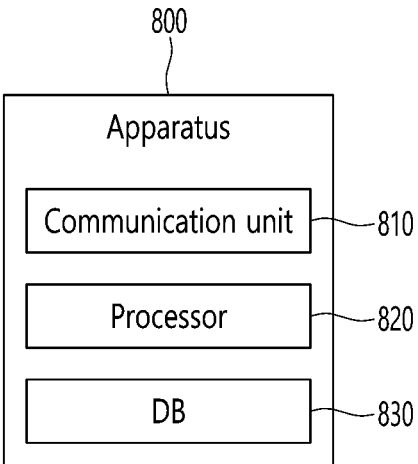

4 apparent from the following description taken in conjunction with the accompanying drawings, in which:

FIG. 1 is a graph illustrating a Roofline model of device according to an embodiment;

FIG. 2 is a diagram for describing a latency characteristic of device according to an embodiment;

FIG. 3 is a diagram for describing the concept of channel pruning according to an embodiment;

FIG. 4 is a diagram for describing a filter decomposition-based compressing method according to an embodiment;

FIG. 5 is a flowchart of a method of compressing a neural network model according to an embodiment;

FIGS. 6A and 6B are diagrams for describing a method of adjusting a target number of output channels according to an embodiment;

FIG. 7 is a flowchart of a method of compressing a neural network model through filter decomposition, according to an embodiment; and FIG. 8 is a block diagram of an apparatus for compressing a neural network model by using device characteristics, according to an embodiment.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of ordinary skill in the art. In describing the present disclosure, detailed explanations of the related art are omitted when it is deemed that they may unnecessarily obscure the gist of the present disclosure.

Terms used herein are for describing particular embodiments and are not intended to limit the scope of the present disclosure. A singular expression may include a plural expression unless they are definitely different in a context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of device and/or software elements perform certain functions. For example, the functional blocks of the present disclosure may be embodied by at least one microprocessor or by circuit components for a certain function. As another example, the functional blocks of the present disclosure may be implemented using various programming or scripting languages. The functional blocks may be implemented using various algorithms executed by one or more processors. Furthermore, the present disclosure may employ known technologies for electronic settings, signal processing, and/or data processing. Terms such as "mechanism", "element", "unit", or "component" are used in a broad sense and are not limited to mechanical or physical components.

In addition, connection lines or connection members between elements illustrated in the drawings are merely exemplary of functional connections and/or physical or circuit connections. Various alternative or additional functional connections, physical connections or circuit connections may be present in a practical device.

Hereinafter, the present disclosure is described in detail with reference to the accompanying drawings.

FIG. 1 is a graph illustrating a Roofline model of device according to an embodiment.

A Roofline model is a visual model that intuitively shows the performance of device, and represents the unique characteristics of the device.

The x-axis represents arithmetic intensity. The arithmetic intensity is defined as the number of arithmetic operations performed per byte. That is, the arithmetic intensity refers to the ratio of floating point operations (flops) to the total data transfer size. The y-axis represents the performance of the device. In the Roofline model, the performance is defined as the number of arithmetic operations performed per hour, and is expressed in [Flops/s].

When both the x-axis and the y-axis are in logarithmic scale, the graph has a shape of a roof, and thus is called a Roofline model.

Referring to FIG. 1, the graph may be divided into a flat section and an inclined section. The sloped section is called memory bound, and the flat section is called computation bound.

The y value of the flat section refers to the best performance of the device, and the y values of the inclined section are less than the y value of the flat section and thus correspond to a section in which the device is not in its best performance. This is because the performance is limited by a memory bandwidth being low due to a low arithmetic intensity. Therefore, as the length of the inclined section increases, the memory bandwidth may be more limited.

As described above, the ratio of performance to arithmetic intensity may be obtained from a Roofline model of certain device, and thus, the Roofline model may be used to estimate an optimal point of the performance of the device or to estimate the performance of a computing kernel or an application.

FIG. 2 is a diagram for describing a latency characteristic of device according to an embodiment.

The number of channels is an important hyperparameter that is adjusted for efficient neural network design, and the latency characteristic of device refers to a latency (in ms) that occurs in the device as the number of channels of a CNN increases.

For example, when the x-axis is $C_{out}$, the latency characteristic refers to a change in latency that occurs when only $C_{out}$ is adjusted while other hyperparameters are fixed, and similarly, when the x-axis is $C_{in}$, the latency characteristic refers to a change in latency that occurs when only $C_{in}$ is adjusted while other hyperparameters are fixed.

Referring to FIG. 2, it may be seen that, as the number of channels that is represented by the x-axis increases, the latency that is represented by the y-axis increases in a staircase pattern rather than in proportion to the number of channels.

The complexity of a convolution operator is linear, and thus, it is expected that a measured latency will also have a linear relationship with $C_{out}$ or $C_{in}$, however, the actually measured latency does not increase linearly as the number of channels increases, but increases in the staircase pattern.

In compressing a neural network model to be described below, the latency characteristic of device is utilized.

FIG. 3 is a diagram for describing the concept of channel pruning according to an embodiment.

Pruning is to reduce the parameters of a model by removing a connection of a weight with low importance to the accuracy among the weights of the model, and retraining the network to recover the accuracy. Because large-scale neural networks generally have large internal redundancy, the size of a model may be reduced without significant loss of accuracy.

A neural network consists of a plurality of layers, each of which includes at least one node, nodes in adjacent layers are connected to each other with weights, and pruning is to remove nodes or weights from such connections to improve the performance of the network. Therefore, running a pruned neural network model requires less computation than does running the initial neural network model, and thus, computing costs and energy consumption may be reduced.

The related-art pruning methods use the magnitude of a weight as a criterion for determining which of numerous nodes and weights to be removed. That is, the related-art pruning methods are magnitude-based pruning. In detail, after weights are initialized to arbitrary values and the neural network is trained, the magnitudes of the post-training weights are compared with each other to prune the weights having low magnitudes such that the target sparsity is satisfied. However, according to this method, it is highly likely that a weight with a low initial value is pruned. That is, there is a possibility that a weight, the magnitude of which has been refined to a low value, is preferentially pruned. Because the weights differ in the number of times of training from each other, a weight with a high value may not be as important as a weight with a low value.

FIG. 3 illustrates an example of pruning a channel in order to solve such an issue.

Channel pruning is structured pruning and refers to a technique of pruning parameters in units of channels.

In a compact network 320 obtained by performing pruning, compared to an existing network 310, the number of channels corresponding to the input and output of each layer has been adjusted based on a channel scaling factor so as to compress the network, and thus, such a pruning method may solve the issues in magnitude-based pruning methods, and has high scalability and compatibility to be easily applied to various CNN models.

FIG. 4 is a diagram for describing a filter decomposition-based compressing method according to an embodiment.

Filter decomposition is a compressing technique that decomposes layers of a model and then approximates original values while partially restoring only important information.

An arbitrary m×n matrix may be decomposed into an m×m matrix, an m×n matrix, and an n×n matrix through singular value decomposition, and in this case, an m×n matrix may be restored based on the matrices. Here, when matrices obtained by decomposing an arbitrary matrix A through singular value decomposition are defined as a U matrix, a sigma matrix, and a V matrix, the matrix A may be approximated into a matrix A' by using p singular values. That is, an appropriate matrix A' is partially restored by using only a part of the matrices obtained from the decomposition.

A typical CNN linearly transforms an input tensor into an output tensor through a kernel K. Here, K is a four-dimensional tensor with a size of D×D×S×T. Here, when the size of an input tensor is H×W×S, an output tensor having a size of H'×W'×T is output through K. On the other hand, in filter decomposition, one high-dimensional tensor is decomposed into a plurality of tensors.

In an embodiment of filter decomposition, one high-dimensional tensor may be decomposed into one core tensor and two factor matrices. In this case, the core tensor has a size of $D×D×R_3×R_4$, and the factor matrices have sizes of $1×1×S×R_3$, $1×1×R_4>×T$, respectively. In such a decomposition process, the above-described singular value decomposition may be utilized, and the values of $R_3$ and $R_4$ correspond to a singular value p, and thus, the closer $R_3$ and $R_4$ are to S and T, respectively, the more approximate to the initial tensor they may be expressed.

Referring to FIG. 4, it may be seen that, as an embodiment of filter decomposition, an input tensor having a size of H×W×S is converted into an output tensor having a size of H'×W'×T through a channel size adjustment operation 410, a core operation 420, and a channel size restoration operation 430.

For example, channel size adjustment may be performed through the channel size adjustment operation 410 such that an input tensor having a size of H×W×S is converted into a tensor having a size of $H×W×R_3$. $R_3$ is a rank-in value corresponding to the singular value p of S, and is the number of input channels in the core operation 420.

In addition, the core operation 420 converts a tensor having a size of $H×W×R_3$ into a tensor having a size of $H'×W'×R_4$, which may mean a practical convolution operation that approximates a value that the initial model is to express from important information of layers. Here, $R_4$ is a rank-out value corresponding to the singular value p of T, and is the number of output channels in the core operation 420.

Finally, channel size restoration may be performed through the channel size restoration operation 430 such that a tensor having a size of $H'×W'×R_4$ is restored into an output tensor having a size of H'×W'×T.

Through the filter decomposition technique, the amount of information of a high-dimensional output tensor that is output through an existing kernel may be simulated with only a few singular values p. That is, the model may be compressed to have a reduced size but similar performance to that of the initial model.

FIG. 5 is a flowchart of a method of compressing a neural network model according to an embodiment.

According to a compressing method according to an embodiment, optimal parameters may be applied by adjusting parameters based on device-specific characteristics for existing compressing techniques. That is, it is possible to provide a method of applying a compressing technique in a device-friendly manner.

In operation 510, an apparatus for compressing a neural network model (hereinafter, referred to as 'apparatus') may obtain, based on a user input or a predefined algorithm, a target number of output channels of a target layer to be compressed among layers included in a neural network model that is executed by a device.

In an embodiment, the apparatus may obtain the target number of output channels based on Structured Layer-adaptive Sparsity for the Magnitude-based Pruning (SLAMP). In detail, unlike unstructured pruning methods, SLAMP is a structured pruning method developed to measure the importance of each layer. Accordingly, the apparatus may determine a pruning ratio according to the SLAMP and automatically obtain the target number of output channels of the target layer to be compressed according to the determined pruning ratio.

In an embodiment, because the output channels of the target layer respectively correspond to the input channels of the next layer, the number of output channels of the target layer may correspond to the number of input channels of the next layer connected to the target layer.

In operation 520, the apparatus may adjust the target number of output channels to meet a certain purpose, based on at least one of a first latency characteristic for the output channels of the target layer and a second latency characteristic for the input channels of the next layer, according to the device characteristics of the device.

As described above with reference to FIG. 2, the first latency characteristic for the output channels may refer to a latency characteristic in a case in which the x-axis is $C_{out}$. In detail, the first latency characteristic may refer to the characteristic that the latency changes in a staircase pattern when other hyperparameters are fixed and only $C_{out}$ is adjusted.

Similarly, the first latency characteristic for the input channels may refer to a latency characteristic in a case in which the x-axis is $C_{in}$. In detail, the second latency characteristic may refer to the characteristic that the latency changes in a staircase pattern when other hyperparameters are fixed and only $C_{in}$ is adjusted.

Because the device characteristics for certain device are unique, the latency characteristic for the output channels and the latency characteristic for the input channel are also unique characteristics. Accordingly, in an embodiment, the apparatus may utilize the first latency characteristic or the second latency characteristic in compressing the neural network model.

In an embodiment, the apparatus may compare the arithmetic intensity of the target layer with the arithmetic intensity of the next layer to select, as a reference layer, the layer having the higher arithmetic intensity, and adjust the target number of output channels to meet the certain purpose based on the latency characteristic related to the reference layer.

For example, the apparatus may compare, based on a Roofline model of the device, the arithmetic intensity of the target layer with the arithmetic intensity of the next layer to determine which of the first latency feature and the second latency feature to utilize. The layer having the higher arithmetic intensity, which is determined by the comparing, refers to higher device performance, and thus, the apparatus may determine, as the reference layer, the layer having the higher arithmetic intensity. In this case, the apparatus adjusts the target number of output channels based on the first latency characteristic in a case in which the reference layer is the target layer, and adjusts the target number of output channels based on the second latency characteristic in a case in which the reference layer is the next layer.

FIGS. 6A and 6B are diagrams for describing a method of adjusting a target number of output channels according to an embodiment.

FIG. 6A is a graph showing the first latency characteristic related to the target layer, and FIG. 6B is a graph showing the second latency characteristic related to the next layer.

In an embodiment, a latency characteristic may include a plurality of steps, each of which is a section comprising numbers of channels corresponding to the same latency across the same step size.

For example, referring to FIG. 6A, the first latency characteristic may include a plurality of steps 610, 620, 630, and 640, each of which is a section comprising numbers of channels corresponding to the same latency across a first step size. Although FIG. 6A shows that the first step size is 8, the present disclosure is not limited thereto.

For example, the step 610 may have the same latency of about 24.7 ms across the first step size, which is 8, and the step 620 may have the same latency of about 25.4 ms within the first step size, which is 8. The reason for this characteristic is because the latency characteristic of the device has the staircase pattern.

Similarly, referring to FIG. 6B, the second latency characteristic may include a plurality of steps 650, 660, and 670, each of which is a section comprising numbers of channels corresponding to the same latency across a second step size. Although FIG. 6B shows that the second step size is 32, the present disclosure is not limited thereto.

In an embodiment, the apparatus may select, as a reference step, a step of the latency characteristic related to the reference layer. For example, in a case in which the reference layer is the target layer, the apparatus may select, as the reference step, one of the plurality of steps 610, 620, 630, and 640 of the first latency characteristic, whereas, in a case in which the reference layer is the next layer, the apparatus may select, as the reference step, one of the plurality of steps 650, 660, and 670 of the second latency characteristic.

In an embodiment, the apparatus may adjust the target number of output channels to meet the certain purpose.

Hereinafter, a process of adjusting a target number of output channels 641 to meet a certain purpose is described with reference to FIG. 6A on the assumption that the target number of output channels 641 of the target layer obtained by the apparatus is 230 and the reference layer is the target layer.

In a case in which the target layer is selected as the reference layer, the obtained target number of output channels 641 is 230, and thus, the apparatus may select, as the reference step, the step 640 among the plurality of steps 610, 620, 630, and 640 of the first latency characteristic.

In an embodiment, the apparatus may determine that the certain purpose is to improve the performance of the neural network model. In this case, according to the determining, the apparatus may adjust the target number of output channels 641 to be the largest number of channels among those for which the latency of the reference step 640 is constant.

For example, because the latency is constant across the first step size of the reference step 640, the apparatus may adjust, based on the first step size of the reference step 640, the target number of output channels 641 to be the largest number of channels (i.e., about 232) among those for which the latency of the reference step 640 is constant.

As described above, by selecting, from the step in which the latency is constant, the number of channels that maximizes the performance of the neural network, the target number of output channels may be adjusted to meet the certain purpose.

In an embodiment, the apparatus may determine that the certain purpose is to reduce the latency of the neural network model. In this case, according to the determining, the apparatus may adjust the target number of output channels 641 to a value one less than the smallest number of channels among those for which the latency of the reference step 640 is constant. In other words, the apparatus may adjust the target number of output channels to be the largest number of channels of the previous step 630 having a lower latency than that of the reference step 640.

For example, the apparatus may adjust, based on the first step size of the reference step 640, the target number of output channels to be the largest number of channels (i.e., about 224) among those of the previous step 630 for which a lower latency than that of the reference step 640 is constant.

As described above, by selecting, from the step in which the latency is constant, the number of channels that reduces the latency of the neural network, the target number of output channels may be adjusted to meet the certain purpose.

In an embodiment, the apparatus may adjust, based on the step size of the reference step 640, the target number of output channels 641 to the value closest to the target number of output channels 641 among the largest number of channels of the reference step 640 and the largest number of channels of the previous step having a lower latency than that of the reference step 640.

For example, referring to FIG. 6A, the apparatus may adjust the target number of output channels 641 to be the largest number of channels of the reference step 640, which is closest to the target number of output channels 641 among the largest number of channels and the smallest number of channels of the reference step 640. That is, the apparatus may adjust the target number of output channels 641 to a multiple of the step size closest to the target number of output channels 641 among multiples of the step size of the reference step 640.

Accordingly, it is possible to achieve the purpose of efficiently achieving the maximum performance or minimum latency while adjusting the target number of output channels to a minimum value.

A process of adjusting a target number of output channels 661 to meet a certain purpose for the case illustrated in FIG. 6B in which it is assumed that the target number of output channels 661 of the target layer obtained by the apparatus is 230 and the reference layer is the next layer is as described above with reference to FIG. 6A.

Referring back to FIG. 5, in operation 530, the apparatus may compress the neural network model such that the number of output channels of the target layer is equal to the adjusted target number of output channels. Because the target number of output channels has been adjusted to meet the certain purpose determined by the apparatus, an algorithm is applied to the target layer to have the adjusted number of output channels, so as to compress the neural network model.

Although the process of applying, to a channel pruning-based compressing technique, the method of optimizing a target number of output channels is described above, in another embodiment, the apparatus may also apply, to a filter decomposition-based compressing technique, the method of optimizing a target number of output channels.

FIG. 7 is a flowchart of a method of compressing a neural network model through filter decomposition, according to an embodiment.

The apparatus may apply the method of optimizing a target number of output channels to the channel size adjustment operation, the core operation, and the channel size restoration operation described above in relation to filter decomposition.

In detail, in operation 710, the apparatus may obtain a target number of output channels of a target sub-layer among a plurality of sub-layers to be generated by decomposing a target layer to be compressed. That is, in a case in which a filter decomposition technique is applied to the target layer to be compressed, the apparatus may obtain the target number of output channels of the sub-layer that is one of the plurality of sub-layers to be generated by the decomposing. In this case, the plurality of sub-layers may be layers related to the channel size adjustment operation, the core operation, and the channel size restoration operation. Also, the number of output channels of the target sub-layer may correspond to the number of input channels of the next sub-layer connected to the target sub-layer.

In addition, according to an embodiment, the apparatus may obtain the target number of output channels based on variational Bayesian matrix factorization (VBMF). The calibration ratio of the target number of output channels according to the VBMF has a value between −1 and 1, and the default value is set to 0. In a case in which the calibration ratio is 1, the obtained target number of output channels is equal to a rank-in value before adjustment, and in a case in which the calibration ratio is −1, the obtained target number of output channels is 0. In other words, as the calibration ratio decreases, the obtained target number of output channels decreases. Accordingly, the apparatus may automatically obtain the target number of output channels of the target sub-layer to be compressed, according to the calibration ratio recommended according to the VBMF.

In operation 720, the apparatus may adjust the target number of output channels to meet a certain purpose, based on any one of a first latency characteristic for the output channels of the target sub-layer, and a second latency characteristic for the input channels of the next sub-layer, according to the device characteristics of device.

For example, in a case in which the target sub-layer is a layer on which the channel size adjustment operation is to be performed, the apparatus may obtain a target number of output channels (i.e., a rank-in value) with respect to the channel size adjustment operation, and adjust the target number of output channels to $R_3$ to meet a certain purpose, based on any one of a first latency characteristic for the output channels of the layer on which the channel size adjustment operation is to be performed, i.e., the target sub-layer, and a second latency characteristic for the input channels of a layer on which the core operation is to be performed, i.e., the next sub-layer.

Next, as another example, in a case in which the target sub-layer is a layer on which the core operation is to be performed, the apparatus may obtain a target number of output channels (i.e., a rank-out value) with respect to the core operation, and adjust the target number of output channels to $R_4$ to meet a certain purpose, based on any one of a first latency characteristic for the output channels of the layer on which the core operation is to be performed, i.e., the target sub-layer, and a second latency characteristic for the input channels of a layer on which the channel size restoration operation is to be performed, i.e., the next sub-layer.

Next, the process of adjusting a target number of output channels with respect to the channel size restoration operation is the same as the process described above, and thus, redundant descriptions are omitted.

In an embodiment, the apparatus may compare the arithmetic intensity of the target sub-layer with the arithmetic intensity of the next sub-layer to select, as a reference sub-layer, the sub-layer having the higher arithmetic intensity, and adjust the target number of output channels to meet the certain purpose, based on the latency characteristic related to the reference sub-layer. For example, in a case in which the target sub-layer is a layer on which the channel size adjustment operation is to be performed, the apparatus may compare the arithmetic intensity of the layer on which the channel size adjustment operation is to be performed, with the arithmetic intensity of a layer on which the core operation is to be performed, i.e., the next sub-layer, to select, as the reference sub-layer, the sub-layer having the higher arithmetic intensity. Similarly, in a case in which the target sub-layer is a layer on which the core operation or the channel size restoration operation is to be performed, the process of selecting the reference sub-layer may also be the same as in the present embodiment.

In addition, the process of adjusting the target number of output channels according to a certain purpose may be the same as the process described above with reference to FIGS. 6A and 6B.

In operation 730, the apparatus may compress the neural network model by decomposing the layer to be compressed such that the number of output channels of the target sub-layer is equal to the adjusted target number of output channels. Because the target number of output channels is adjusted to meet the certain purpose determined by the apparatus, an algorithm is applied to the target sub-layer to have the adjusted number of output channels, so as to compress the neural network model.

Applying the compressing method according to an embodiment to a filter decomposition technique is not limited to that described above, and the apparatus may also apply the compressing method according to an embodiment only to the core operation, with respect to the channel size S of a given input tensor and the channel size T of a given output tensor.

As described above, a filter decomposition model may be compressed by applying the compressing method according to an embodiment to a filter decomposition technique several times according to the operation, and the compressing method according to an embodiment may be selectively applied to a pruning method and a filter decomposition method according to a user input for selecting a compressing method model.

FIG. 8 is a block diagram of an apparatus for compressing a neural network model by using device characteristics, according to an embodiment.

Referring to FIG. 8, an apparatus 800 may include a communication unit 810, a processor 820, and a database (DB) 830. FIG. 8 illustrates the apparatus 800 including only the components related to an embodiment. Therefore, it would be understood by those skilled in the art that other general-purpose components may be further included in addition to those illustrated in FIG. 7.

The communication unit 810 may include one or more components for performing wired/wireless communication with an external server or an external device. For example, the communication unit 810 may include at least one of a short-range communication unit (not shown), a mobile communication unit (not shown), and a broadcast receiver (not shown). In an embodiment, the communication unit 810 may obtain a target number of output channels of a target layer or a target sub-layer.

The DB 830 is hardware for storing various data processed by the apparatus 800, and may store a program for the processor 820 to perform processing and control.

The DB 830 may include random-access memory (RAM) such as dynamic RAM (DRAM) or static SRAM, read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 820 controls the overall operation of the apparatus 800. For example, the processor 820 may execute programs stored in the DB 830 to control the overall operation of an input unit (not shown), a display (not shown), the communication unit 810, the DB 830, and the like. The processor 820 may execute programs stored in the DB 830 to control the operation of the apparatus 800.

The processor 820 may control at least some of the operations of the apparatus for compressing a neural network model described above with reference to FIGS. 1 to 7.

The processor 820 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

In an embodiment, the apparatus 800 may be a server. The server may be implemented as a computer device or a plurality of computer devices that provide a command, code, a file, content, a service, and the like by performing communication through a network. The server may receive data necessary to compress a neural network model, and compress the neural network model based on the received data.

Meanwhile, an embodiment of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and be usable by those skill in the art of computer software. Examples of the computer program may include not only machine code, such as code made by a compiler, but also high-level language code that is executable by a computer by using an interpreter or the like.

According to an embodiment, the method according to various embodiments disclosed herein may be included in a computer program product and provided. The computer program products may be traded as commodities between sellers and buyers.

The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods described herein may be performed in any suitable order unless otherwise indicated herein or otherwise clearly contradicted by context. The present disclosure is not limited to the described order of the operations. The use of any and all examples, or exemplary language provided herein, is intended merely to better illuminate the present disclosure and does not pose a limitation on the scope of the present disclosure unless otherwise claimed. In addition, various modifications, combinations, and adaptations will be readily apparent to those skill in the art without departing from the following claims and equivalents thereof.

Accordingly, the spirit of the present disclosure should not be limited to the above-described embodiments, and all modifications and variations which may be derived from the meanings, scopes and equivalents of the claims should be construed as failing within the scope of the present disclosure.

According to an embodiment of the present disclosure, it is possible to provide a compress model optimized for device characteristics by deriving an optimal parameter from the inherent characteristics of device.

In addition, according to an embodiment of the present disclosure, it is possible to provide an automatic compressing algorithm that is applicable to various compressing techniques.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of compressing a neural network model, which is performed by a computing device, by using device characteristics, the method comprising:

obtaining the neural network model that is executed by a device, adjusting a target number of output channels of a target layer included in the neural network model, based on an arithmetic intensity obtained from a roofline model and a latency characteristic of a staircase pattern of the device; and compressing the neural network model by using at least one of channel pruning and filter decomposition on the target layer to be compressed such that a number of output channels of the target layer is equal to the adjusted target number of output channels;

wherein the adjusting comprises:

comparing an arithmetic intensity of the target layer with an arithmetic intensity of a next layer which is connected to the target layer;

selecting, as a reference layer, a layer having a higher arithmetic intensity based on a result of the comparison; and adjusting the target number of output channels based on a latency characteristic of the selected reference layer, wherein in a case in which the selected reference layer is the target layer, the adjusting is based on a first latency characteristic for the output channels of the target layer and in a case in which the reference layer is the next layer, the adjusting is based on a second latency characteristic for input channels of the next layer.

2. The method of claim 1, wherein the latency characteristic of the reference layer is one of a latency characteristic for the number of output channels of the target layer and a latency characteristic for the number of input channels of the next layer and, wherein the target number of output channels is equal to the number of input channels of the next layer.

3. The method of claim 1, wherein the adjusting further comprises:

determining, as a reference step, a step corresponding to the target number of output channels from among a plurality of steps of the latency characteristic related to the reference layer; and adjusting the target number of output channels, based on the number of channels in any one of a largest number of channels of the reference step and a largest number of channels of a previous step having a lower latency than the latency of the reference step;

wherein each of the plurality of steps is a section of the number of channels corresponding to the same latency across a step size.

4. The method of claim 1, wherein the adjusting further comprises:

determining, as a reference step, a step corresponding to the target number of output channels from among a plurality of steps of the latency characteristic related to the reference layer; and adjusting the target number of output channels to be a number of channels that minimizes the adjusting the number of target output channels among a largest number of channels of the reference step and a largest number of channels of a previous step having a lower latency than the latency of the reference step.

5. The method of claim 1, wherein the adjusting further comprises:

adjusting the target number of output channels to be a number of channels that maximizes the performance of the neural network model among a plurality of steps of the latency characteristic related to the reference layer, adjusting the target number of output channels to be a number of channels that reduces the latency of the neural network model among a plurality of steps of the latency characteristic related to the reference layer, or adjusting the target number of output channels to be a number of channels that minimizes the adjusting the number of target output channels among a number of channels that maximizes the performance of the neural network model and a number of channels that reduces the latency of the neural network model, among a plurality of steps of the latency characteristic related to the reference layer, wherein each of the plurality of steps is a section of the number of channels corresponding to the same latency across a step size.

6. A method of compressing a neural network model which is performed by a computing device, by using device characteristics, the method comprising:

obtaining the neural network model that is executed by a device;

adjusting a target number of output channels of a target sub-layer of a layer to be compressed from among layers included in the neural network model, based on an arithmetic intensity obtained from a roofline model and a latency characteristic of a staircase pattern of the device; and compressing the neural network model by decomposing the layer to be compressed such that the number of output channels of the target sub-layer is equal to the adjusted target number of output channels;

wherein the target sub-layer is one of a plurality of sub-layers generated by decomposing the layer to be compressed;

wherein the adjusting comprises:

comparing an arithmetic intensity of a target sub-layer with an arithmetic intensity of a next sub-layer which is connected to the target sub-layer;

selecting, as a reference sub-layer, a sub-layer having a higher arithmetic intensity based on a result of the comparison; and adjusting the target number of output channels based on a latency characteristic of the selected reference sub-layer, wherein in a case in which the selected reference sub-layer is the target sub-layer, the adjusting is based on a first latency characteristic for the output channels of the target sub-layer and in a case in which the reference sub-layer is the next sub-layer, the adjusting is based on a second latency characteristic for input channels of the next sub-layer.

7. The method of claim 6, wherein the latency characteristic of the reference sub-layer is one of the latency characteristic for the number of output channels of the target sub-layer and the latency characteristic for the number of input channels of the next sub-layer and, wherein the target number of output channels is equal to the number of input channels of the next sub-layer.

8. The method of claim 6, wherein the adjusting further comprises, determining, as a reference step, a step corresponding to the target number of output channels from among a plurality of steps of the latency characteristic related to the reference sub-layer; and adjusting the target number of output channels, based on the number of channels in any one of a largest number of channels of the reference step and a largest number of channels of a previous step having a lower latency than the latency of the reference step;

wherein each of the plurality of steps is a section of the number of channels corresponding to the same latency across a step size.

9. The method of claim 6, wherein the adjusting further comprises determining, as a reference step, a step corresponding to the target number of output channels from among a plurality of steps of the latency characteristic related to the reference sub-layer; and adjusting the target number of output channels to be a number of channels that minimizes the adjusting the number of target output channels among a largest number of channels of the reference step and a largest number of channels of a previous step having a lower latency than the latency of the reference step.

10. The method of claim 6, wherein the adjusting further comprises:

adjusting the target number of output channels to be a number of channels that maximizes the performance of the neural network model among a plurality of steps of the latency characteristic related to the reference sub-layer, adjusting the target number of output channels to be a number of channels that reduces the latency of the neural network model among a plurality of steps of the latency characteristic related to the reference sub-layer, or adjusting the target number of output channels to be a number of channels that minimizes the adjusting the number of target output channels among a number of channels that maximizes the performance of the neural network model and a number of channels that reduces the latency of the neural network model, among a plurality of steps of the latency characteristic related to the reference sub-layer, wherein each of the plurality of steps is a section of the number of channels corresponding to the same latency across a step size.

11. An apparatus for performing, by a computing device, a compression of a neural network model, by using device characteristics, the apparatus comprising:

a memory storing at least one program; and at least one processor configured to execute the neural network model by executing the at least one program, wherein the at least one processor is further configured to:

obtain the neural network model that is executed by a device;

adjust a target number of output channels of a target layer included in the neural network model, based on an arithmetic intensity obtained from a roofline model and a latency characteristic of a staircase pattern of the device;

compare an arithmetic intensity of the target layer with an arithmetic intensity of a next layer which is connected to the target layer;

select, as a reference layer, a layer having a higher arithmetic intensity based on a result of the comparison;

adjust the target number of output channels of the target layer based on a first latency characteristic of the selected reference layer, wherein in a case in which the selected reference layer is the target layer, the adjusting is based on a first latency characteristic for the output channels of the target layer and in a case in which the reference layer is the next layer, the adjusting is based on a second latency characteristic for input channels of the next layer; and compress the neural network model by using at least one of channel pruning and filter decomposition on the target layer to be compressed such that a number of output channels of the target layer is equal to the adjusted target number of output channels.

* * * * *